United States Patent
Tsuruhara et al.

(10) Patent No.: US 12,556,360 B2
(45) Date of Patent: Feb. 17, 2026

(54) SIGNAL TRANSMITTING AND RECEIVING DEVICE AND BIDIRECTIONAL COMMUNICATION SYSTEM

(71) Applicant: THINE ELECTRONICS, INC., Tokyo (JP)

(72) Inventors: Shuhei Tsuruhara, Tokyo (JP); Shunichi Kubo, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 314 days.

(21) Appl. No.: 18/446,155

(22) Filed: Aug. 8, 2023

(65) Prior Publication Data

US 2024/0056284 A1 Feb. 15, 2024

(30) Foreign Application Priority Data

Aug. 9, 2022 (JP) ................. 2022-126992

(51) Int. Cl.
*H04L 7/00* (2006.01)
(52) U.S. Cl.
CPC ................. *H04L 7/0079* (2013.01)
(58) Field of Classification Search
CPC .................................................... H04L 7/0079
See application file for complete search history.

(56) References Cited

U.S. PATENT DOCUMENTS 7,177,288 B2  2/2007  Mooney et al.
2012/0183091 A1*  7/2012  Komori ............... H03K 9/06
375/259

FOREIGN PATENT DOCUMENTS

| JP | 10-145436 A | 5/1998 |
| JP | 5638095 B2 | 12/2014 |
| WO | 2011/112851 A2 | 9/2011 |

* cited by examiner

*Primary Examiner* — Duc C Ho
(74) *Attorney, Agent, or Firm* — Sughrue Mion, PLLC

(57) ABSTRACT

A bidirectional communication system includes a signal transmitting and receiving device and a signal transmitting and receiving device that perform bidirectional communication via a transmission path. The signal transmitting and receiving device includes a driver, a filter, a receiver, and a controller. The receiver recovers a clock signal by performing frequency locking on a training pattern signal output through the filter, and outputs a recovered clock to the controller. The controller receives the recovered clock output from the receiver, controls a cutoff frequency of the filter, and controls an operation of the driver based on a frequency information of the recovered clock signal.

10 Claims, 5 Drawing Sheets

SIGNAL TRANSMITTING AND RECEIVING DEVICE AND BIDIRECTIONAL COMMUNICATION SYSTEM

TECHNICAL FIELD

The present disclosure relates to signal transmitting and receiving devices and bidirectional communication systems.

BACKGROUND

As methods of bidirectional communication between the signal transmitting and receiving devices, the following are known: space division method, time division method, common modulation method, echo cancellation method, and frequency division method. Hereafter, a signal transmitted from a first signal transmitting and receiving device to a second signal transmitting and receiving device will be referred to as a "first signal," and a signal transmitted from the second signal transmitting and receiving device to the first signal transmitting and receiving device will be referred to as a "second signal."

In the space division method, a transmission path for transmitting the first signal and a transmission path for transmitting the second signal are separated. Although this method allows for full duplex communication, it requires many transmission paths and connectors, which raises issues regarding increases in both weight and cost.

In the time division method, the transmission path for transmitting the first signal and the transmission path for transmitting the second signal are provided in common. The transmission of the first signal is stopped in a period for transmitting the second signal. On the contrary, during the period in which the second signal is transmitted, the transmission of the first signal is stopped. This system raises a problem such that latency becomes long due to transmission of one signal being impossible in a transmission period of the other signal.

In the common modulation method (common-mode modulation method described in Patent Document 1 below), a common transmission path is used to transmit both the first signal and the second signal. The transmission path in Patent Document 1 includes two lines, the first signal transmits as a differential signal, and the second signal transmits using a common mode. The differential signal consists of two signals. One of the signals is inverted in relation to the other signal, and these two signals transmit through the two lines, respectively. For example, if one signal is 0.5V, the other signal is −0.5V. In the common mode, the relevant signals are the same. For example, if one signal is 0.5V, the other signal is also 0.5V. In the differential signaling method, two signals of the differential signal are inverted each other, and the relevant currents flowing through the two transmission lines satisfy an inverted relationship, which cancels out magnetic fields generated by the currents. However, in the common mode, the magnetic fields generated by flows of the currents cannot be cancelled because currents flow in the same phase, which results in an EMI (Electro Magnetic Interference) radiation problem.

In the echo cancellation method (Patent Document 2 below), full-duplex communication is achieved by echo cancelling the second signal in a receiver that receives the first signal in the second signal transmitting and receiving device. The same process is used in the first signal transmitting and receiving device. However, in this method, the necessary cancellation characteristics change due to other environmental factors such as loads and the like in the transmission path when a data rate of the second signal is high, making complete cancellation difficult. Achieving complete cancellation requires advanced digital processing based on an analog-to-digital converter and a digital signal processor (DSP), which increases a circuit area and power consumption. Even if the data rate of the second signal is reduced to a level unaffected by the environment, it is still necessary to add a high-speed buffer for electrical isolation and a high-speed buffer for adding a superimposed signal and cancel signal to a front stage of the receiver that receives the first signal, which further increases power consumption.

In the frequency division method (Patent Document 3 below), a common transmission path is provided to transmit the first signal and the second signal. Frequency bands of the first and second signals differ, and the first and second receiving devices each have a filter for signal selection at the front stage. Cut-off frequencies of the filters for the first and second receiving devices are different. The filter prevents the second signal from entering the receiver that receives the first signal in the second signal transmitting and receiving device. The filter in the first signal transmitting and receiving device functions similarly.

When comparing the five methods, the frequency division method is the most suitable in terms of weight, cost, latency, EMI, and power consumption.

(Patent Document 1) Japanese Patent Application Laid-Open No. 10-145436.
(Patent Document 2) Japanese Patent No. 5638095
(Patent Document 3) U.S. Pat. No. 7,177,288

SUMMARY

The present inventors have found the following problems when adopting the frequency division method as the bidirectional communication method between the first signal transmitting and receiving device and the second signal transmitting and receiving device.

For instance, we will consider a system that performs bidirectional communication between a host device and a peripheral device. The host device is equipped with the first signal transmitting and receiving device, while the peripheral device is equipped with the second signal transmitting and receiving device. The host device, which includes a computer, has superior processing capabilities in various aspects. The peripheral device, however, is composed mainly of a touch panel type display. The peripheral device displays an image on the screen based on the first signal transmitted from the host device, and transmits information input by a person's finger or fingers onto the touch panel to the host device as the second signal. Examples of such systems include a system for in-vehicle display and a system for amusement equipment such as game machines.

Generally, in such cases, the data rate of the first signal, which transmits video information including a large amount of data, is high, whereas the data rate of the second signal, which transmits touch panel operation information including a small amount of data, is low.

In the system described above, there are various standards for displays of the peripheral devices and various specifications required by applications.

For instance, the display resolution of the peripheral devices is shifting from HD (High Definition) to FHD (Full High Definition), and is expected to increase further. The data rate of the first signal transmitted from the host device to the peripheral device needs to be increased in line with increases in resolution. However, some applications require long-distance transmission using an inexpensive cable as a transmission path, and require that power consumption be reduced as much as possible, which can both be achieved by minimizing the data rate of the first signal. In which case, the transmission path is two lines for transmitting the differential signal(s) or one line for transmitting a single signal.

Furthermore, operations on the touch panel of the peripheral device can be performed not only by a simple touch with one finger, but also by simultaneous touches with multiple fingers. This has resulted in increases in the amount of information of the second signal transmitted from the peripheral device to the host device. A touch panel operator of the peripheral device expects quick transmission of the input information to the host device, and also expects video image corresponding to the operation to be displayed on the display. Therefore, expectations are for the data rate of the second signal transmitted from the peripheral device to the host device to be as high as possible.

However, in conventional bidirectional communication systems that adopt the frequency division method, it is difficult to flexibly set the respective data rates and the like of the first and second signals according to the application. In particular, it is difficult to set the signal transmitting and receiving device in the peripheral device to perform a desired operation in accordance with the respective data rates of the first signal and the second signal because many peripheral devices have limited functionality.

The present disclosure provides a signal transmitting and receiving device and a bidirectional communication system that can easily set the data rate or other parameters for both the first and second signals in bidirectional communication using the frequency division method.

By using bidirectional communication with another-side transmitting receiving device though a transmission path, the signal transmitting and receiving device of the present disclosure receives a first signal that has reached an input/output terminal sent from the other-side signal transmitting and receiving device, and transmits a second signal to the other-side signal transmitting and receiving device though the input/output terminal, the second signal having a data rate lower than a data rate of the first signal.

A first aspect of the signal transmitting and receiving device of the present disclosure comprises: (1) a filter connected to the input/output terminal, and configured to selectively pass and output the first signal, and selectively attenuate the second signal from between the first signal and the second signal; (2) a receiver configured to receive the first signal output through the filter, recover data and a clock signal based on the first signal, and output the recovered data and the clock signal; (3) a driver configured to send the second signal from the input/output terminal to the other-side signal transmitting and receiving device; and (4) a controller configured to control a cutoff frequency of the filter and the data rate of the second signal output from the driver based on a frequency of the recovered clock signal output from the receiver.

The signal transmitting and receiving device of the present disclosure may be configured as follows. In a second aspect, in addition to the first aspect, the receiver receives a training pattern signal from the other-side signal transmitting and receiving device before starting reception of the first signal from the other-side signal transmitting and receiving device, and the receiver performs frequency locking on the training pattern signal, and outputs the recovered clock signal having a frequency that corresponds to the data rate of the first signal.

In a third aspect, in addition to the second aspect, the controller controls the cutoff frequency of the filter to be lower as the frequency of the recovered clock signal is lower, and the controller controls the cutoff frequency of the filter to be higher as the frequency of the recovered clock signal is higher.

In a fourth aspect, in addition to the second aspect or the third aspect, the controller controls the data rate of the second signal to be lower as the frequency of the recovered clock signal is lower, and the controller controls the data rate of the second signal to be higher as the frequency of the recovered clock signal is higher.

In a fifth aspect, in addition to any of the second to the fourth aspects, the controller controls a slew rate of a waveform of the second signal to be lower as the frequency of the recovered clock signal is lower, and the controller controls the slew rate of the waveform of the second signal to be higher as the frequency of the recovered clock signal is higher.

In a sixth aspect, in addition to any of the second to the fifth aspects, by using the second signal, the driver notifies the other-side signal transmitting and receiving device that the receiver ends the frequency locking on the training pattern signal.

In a seventh aspect, in addition to the six aspect, the receiver starts reception of the first signal from the other-side signal transmitting and receiving device after the driver notifies the other-side signal transmitting and receiving device that the frequency locking has ended.

In an eighth aspect, in addition to any of the first to the seventh aspects, the filter includes a high-pass filter or a bandpass filter.

The bidirectional communication system of the present disclosure comprises: the above-mentioned signal transmitting and receiving device; and the other-side signal transmitting and receiving device configured to perform bidirectional communication with the signal transmitting and receiving device via the transmission path. The signal transmitting and receiving device may comprise: a filter connected to an input/output terminal; a clock and data recovery circuit connected to an output terminal of the filter; a driver comprising an output terminal connected to the input/output terminal; and a controller configured to receive a recovered clock signal output from the clock and data recovery circuit, and control a cutoff frequency of the filter and a data rate of the driver.

According to the present disclosure, it is possible to easily set the data rates of the first signal and the second signal in the bidirectional communication system by adopting the frequency division method.

DETAILED DESCRIPTION

Figure 1:
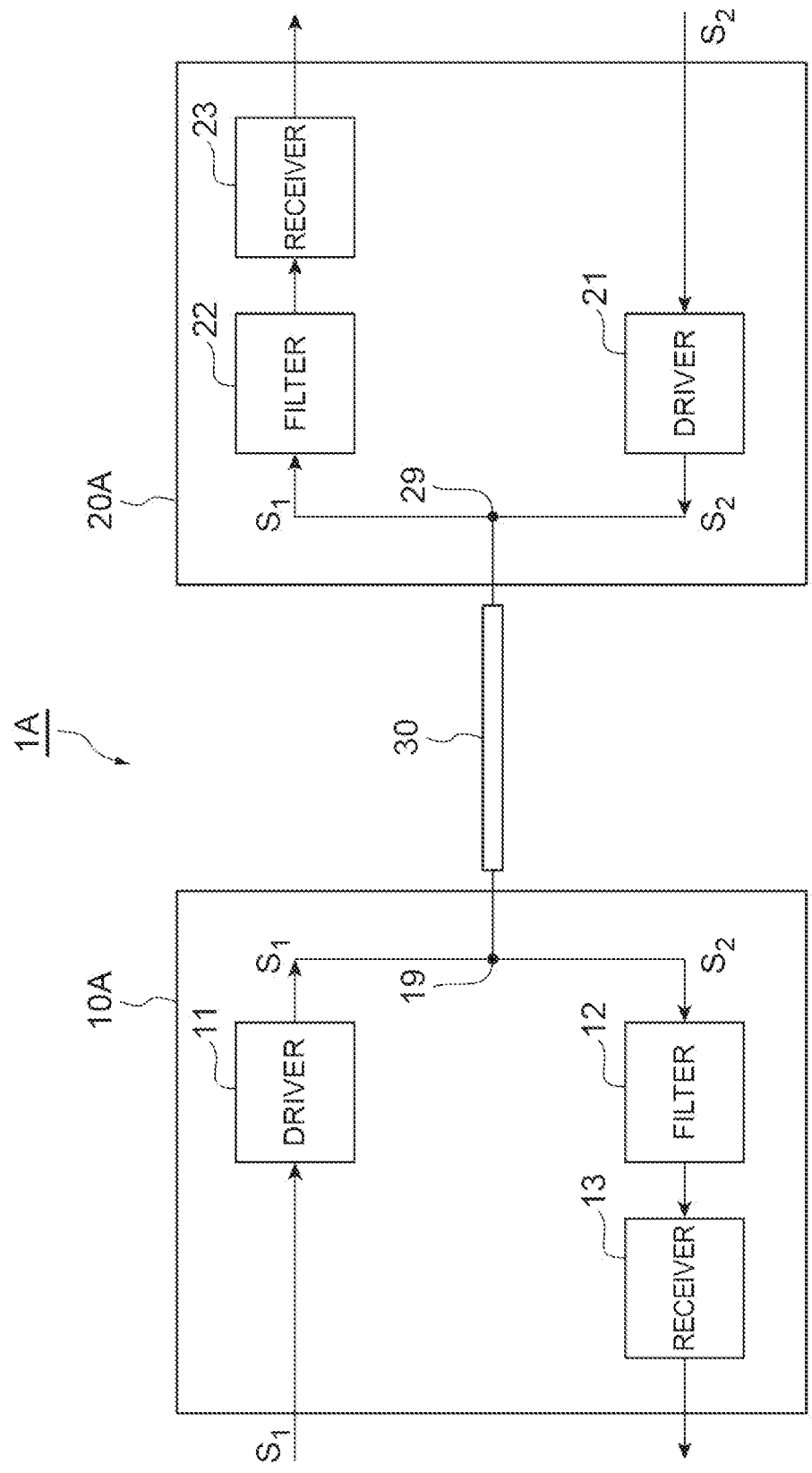
FIG. 1 is a diagram showing a configuration of a bidirectional communication system 1A.

Hereafter, embodiments of the present invention will be described in detail with reference to the accompanying drawings. Note that the same elements will be denoted by the same reference numerals, and redundant descriptions will be omitted.

FIG. 1 shows the configuration of a bidirectional communication system 1A. The bidirectional communication system 1A comprises a signal transmitting and receiving device 10A and a signal transmitting and receiving device 20A. Each of the signal transmitting and receiving device 10A and the signal transmitting and receiving device 20A communicates bidirectionally through a common transmission path 30. The signal transmitting and receiving device 10A is located on the host device side, while the signal transmitting and receiving device 20A is located on the peripheral device side. The data rate of the first signal that is transmitted from the signal transmitting and receiving device 10A to the signal transmitting and receiving device 20A via the transmission path 30 is higher than the data rate of the second signal that is transmitted from the signal transmitting and receiving device 20A to the signal transmitting and receiving device 10A via the transmission path 30. An input/output terminal 19 of the signal transmitting and receiving device 10A and an input/output terminal 29 of the signal transmitting and receiving device 20A are connected to each other through the transmission path 30.

The signal transmitting and receiving device 10A comprises a driver 11, a filter 12, and a receiver 13. The filter 12 may be a part of the receiver 13. The output terminal of the driver 11 and the input terminal of the filter 12 are both connected to the input/output terminal 19. The driver 11 receives a first signal $S_1$ as serial data from the host device and transmits it to the signal transmitting and receiving device 20A via the input/output terminal 19 and the transmission path 30.

The filter 12 receives a second signal $S_2$ as serial data, the second signal reaching the input/output terminal 19 from the signal transmitting and receiving device 10A via the transmission path 30. The first signal $S_1$ output from the driver 11 also enters the filter 12. Between the first signal $S_1$ and the second signal $S_2$, the filter 12 selectively passes and outputs the second signal $S_2$ to the receiver 13, and selectively attenuates the first signal $S_1$. The filter 12 may include a low-pass filter or a bandpass filter. The receiver 13 receives the second signal $S_2$ output through the filter 12, recovers data and clock signal based on the second signal $S_2$, and outputs the recovered data and the recovered clock signal to the host device.

The signal transmitting and receiving device 20A comprises a driver 21, a filter 22, and a receiver 23. The filter 22 may be part of the receiver 23. An output terminal of the driver 21 and an input terminal of the filter 22 are both connected to the input/output terminal 29. The driver 21 receives the second signal $S_2$ as serial data output from the peripheral device, and transmits the second signal $S_2$ to the signal transmitting and receiving device 10A via the input/output terminal 29 and the transmission path 30.

The first signal $S_1$ reaches the input/output terminal 29 from the signal transmitting and receiving device 10A via the transmission path 30, and the filter 22 receives the first signal $S_1$ as serial data. The second signal $S_2$ output from the driver 21 is also enters the filter 22. The filter 22 selectively passes the first signal $S_1$ from between the first signal $S_1$ and the second signal $S_2$. and outputs the first signal $S_1$ to the receiver 23. The filter 22 selectively attenuates the second signal $S_2$. The filter 22 may include a high-pass filter or a bandpass filter. The receiver 23 receives the first signal $S_1$ output through the filter 22, recovers data and a clock (signal) based on the first signal $S_1$, and outputs the recovered data and the recovered clock signal to the peripheral device.

Figure 2A:
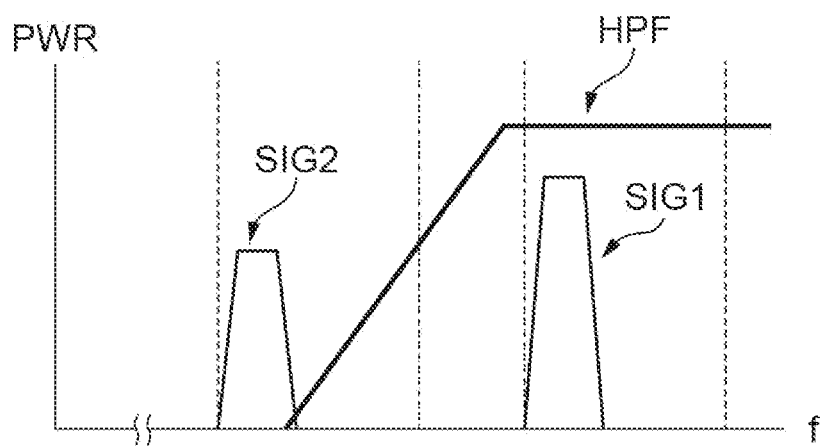
FIG. 2A is a graph showing the relationship between frequency (f) and power (PWR).
Figure 2B:
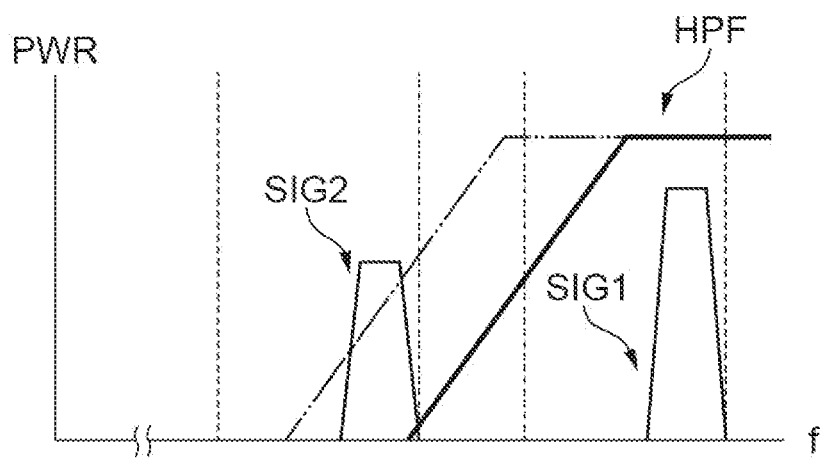
FIG. 2B is a graph showing the relationship between frequency (f) and power (PWR).

FIG. 2A is a graph showing the relationship between the signal frequency (f) and the power (PWR). FIG. 2A shows a frequency band (SIG1) of the first signal $S_1$ and a frequency band (SIG2) of the second signal $S_2$. FIG. 2B is a graph showing the relationship between the signal frequency (f) and the power (PWR). FIG. 2B also shows the frequency band (SIG1) of the first signal $S_1$ and the frequency band (SIG2) of the second signal $S_2$.

In these figures, assuming that the filter 22 is a high-pass filter (HPF), the frequency characteristics (HPF) of the high-pass filter are shown. In order to perform bidirectional communication by the frequency division method, the frequency band (SIG1) of the first signal $S_1$ needs to exist within the pass band of the filter 22, and the frequency band (SIG2) of the second signal $S_2$ needs to exist within the stop band of the filter 22. Therefore, the frequency bands (SIG1, SIG2) of the first signal $S_1$ and the second signal $S_2$ and the cutoff frequency of the filter 22 need to be set in association with each other.

FIG. 2A shows a case where the frequency band (SIG1) of the first signal $S_1$ is relatively low. As shown in FIG. 2A, when the frequency band (SIG1) of the first signal $S_1$ is low, the cutoff frequency of the filter 22 is set to be low accordingly, and the frequency band (SIG2) of the second signal $S_2$ is set to be low accordingly.

FIG. 2B shows a case where the frequency band (SIG1) of the first signal $S_1$ is relatively high. On the other hand, as shown in FIG. 2B, when the frequency band (SIG1) of the first signal $S_1$ is high, the cutoff frequency of the filter 22 can be set high accordingly (solid line), and the frequency band (SIG2) of the second signal $S_2$ can also be set high. That is, the cutoff frequency of the filter 22 is set according to the data rate of the first signal $S_1$ required according to the application, and the data rate of the second signal $S_2$ is also set. If there is a request to increase the data rate of the second signal $S_2$ as much as possible, the data rate of the second signal $S_2$ is set as high as possible within the stop band of the filter 22.

The filter 12 also needs to have a similar frequency characteristic. That is, in order to perform bidirectional communication by the frequency division method, the frequency band of the second signal $S_2$ needs to exist within the pass band of the filter 12, and the frequency band of the first signal $S_1$ needs to exist within the cutoff band of the filter 12.

As the data rate of the second signal $S_2$ becomes higher, the cycle of the second signal $S_2$ becomes shorter, and a magnitude of the second signal $S_2$ becomes smaller due to attenuation at the time of transfer. As a result, the magnitude of the second signal may not reach a predetermined voltage during the 1 UI (Unit Interval). As a result, intersymbol interference (ISI) occurs, and the receiver 13 cannot normally receive the second signal $S_2$. Therefore, when increasing the data rate of the second signal $S_2$, it may be important to increase the slew rate of the waveform of the second signal $S_2$ in order to make the magnitude of the second signal $S_2$ sufficiently large so that ISI does not occur. In addition, when the slew rate is increased, the harmonic of the second signal $S_2$ increases and interferes with the first signal $S_1$, and thus it is not preferable to increase the slew rate. Therefore, the slew rate needs to be appropriately adjusted so as to suppress interference with the first signal $S_1$ while preventing occurrences of ISI. The slew rate is an index indicating a rate of change of the signal waveform.

Figure 3A:
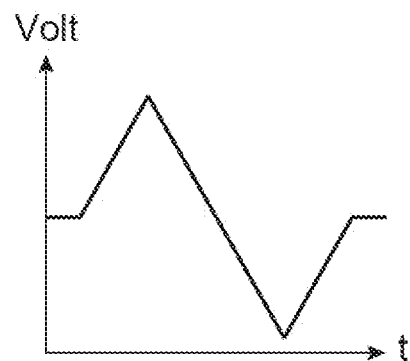
FIG. 3A is a graph showing the relationship between time (t) and voltage (Volt).
Figure 3B:
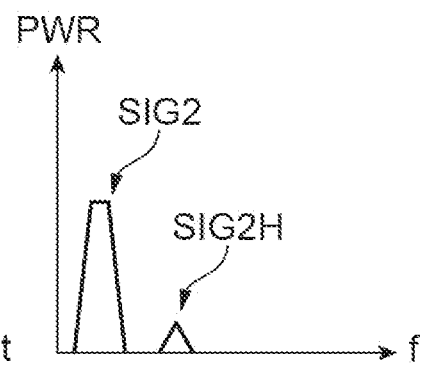
FIG. 3B is a graph showing the relationship between frequency (f) and power (PWR).
Figure 3C:
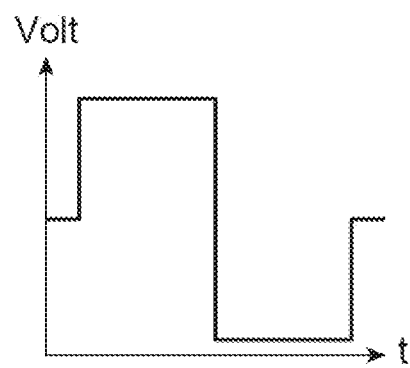
FIG. 3C is a graph showing the relationship between time (t) and voltage (Volt).
Figure 3D:
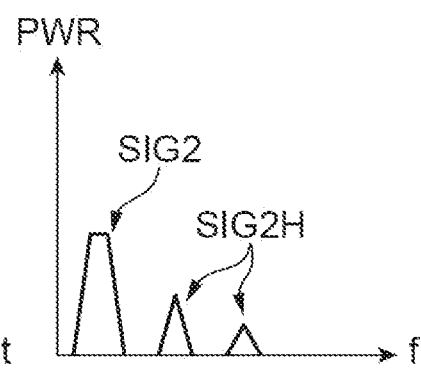
FIG. 3D is a graph showing the relationship between frequency (f) and power (PWR).

FIG. 3A and FIG. 3C each schematically shows the waveform of the second signal $S_2$, and FIG. 3B and FIG. 3D each schematically shows the frequency band of the second signal $S_2$. FIG. 3A is a graph showing the relationship between time (t) and voltage (Volt) of the second signal $S_2$. FIG. 3B is a graph showing the relationship between frequency (f) and power (PWR) of the second signal $S_2$. FIG. 3A and FIG. 3B each shows a case where the slew rate of the waveform of the second signal $S_2$ is relatively low. FIG. 3B shows the frequency band (SIG2) of the second signal $S_2$ and the frequency band (SIG2H) of the harmonic components of the second signal $S_2$.

FIG. 3C is a graph showing the relationship between time (t) and voltage (Volt) of the second signal $S_2$. FIG. 3D is a graph showing the relationship between frequency (f) and power (PWR) of the second signal $S_2$. FIGS. 3C and 3D each shows a case where the slew rate of the waveform of the second signal $S_2$ is relatively high. FIG. 3D shows the frequency band (SIG2) of the second signal $S_2$ and the frequency band (SIG2H) of the harmonic components of the second signal $S_2$. As the slew rate is higher, that is, as compared with the cases of FIG. 3A and FIG. 3B, in the case of FIG. 3C and FIG. 3D, harmonic components appear largely in the vicinity of a frequency of an integer multiple of the data rate of the second signal $S_2$. When these harmonic components are within the pass band of the filter 22 and are large, these harmonic components are also received by the receiver 23, so that the receiver 23 cannot normally receive the first signal $S_1$. Therefore, it is important to set not only the data rate of the second signal $S_2$ but also the slew rate of the waveform of the second signal $S_2$ so that the receiver 23 can normally receive the first signal $S_1$.

As stated above, it is preferable that a maximum cutoff frequency of the filter 22 capable of passing the first signal $S_1$ is set according to the required data rate of the first signal $S_1$ according to an application, the maximum slew rate of the waveform of the second signal $S_2$ capable of sufficiently attenuating harmonic components by the filter 22 is set, and the maximum data rate of the second signal $S_2$ capable of being output by the driver 21 is set at the slew rate.

However, in many cases, functions of the peripheral device are limited, and it is difficult for the peripheral device to enter setting information for various operation conditions of the signal transmitting and receiving devices 20A into the peripheral device. In order to solve this problem, setting information input in the host device is transmitted from the signal transmitting and receiving device 10A to the signal transmitting and receiving device 20A in the technology described in Patent Document 2, by a transmission path provided separately from the transmission path for transmitting for the first signal $S_1$ and the second signal $S_2$, and various operation conditions of the signal transmitting and receiving device 20A are set based on the setting information. However, this technique has many transmission paths and connectors, and has the problem of increases in weight and cost.

Figure 4:
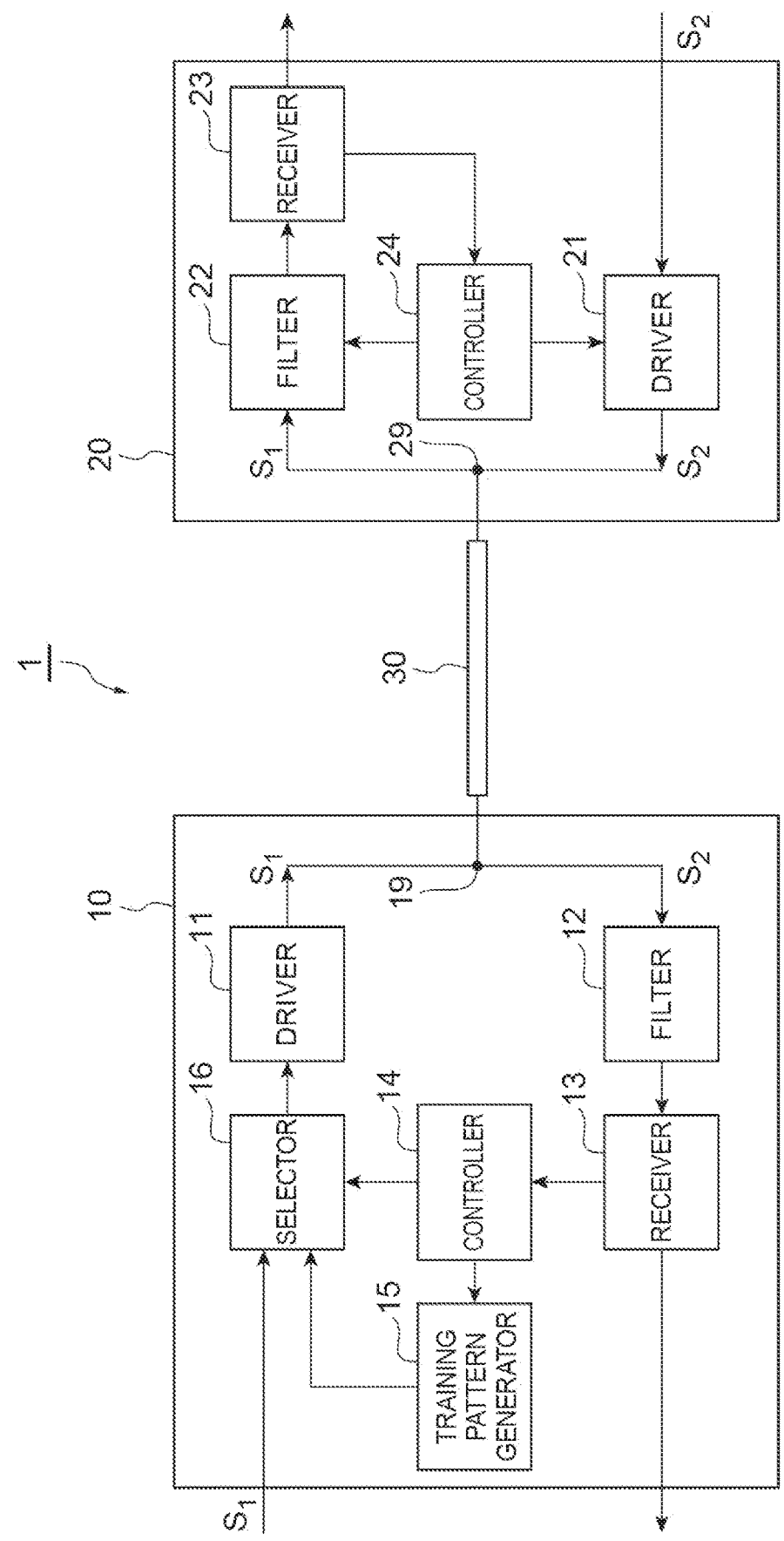
FIG. 4 is a diagram showing the bidirectional communication system 1.

FIG. 4 is a diagram showing the bidirectional communication system 1. The bidirectional communication system 1 (FIG. 4) can solve the above-described problems of the bidirectional communication system 1A (FIG. 1). The bidirectional communication system 1 can set the cutoff frequency of filter 22, the slew rate of the waveform of the second signal $S_2$, and the data rate of $S_2$ in accordance with the data rate of the first signal $S_1$, the data rate of the first signal being required for an application. This can be done without adding more transmission paths or connectors.

The bidirectional communication system 1 comprises a signal transmitting and receiving device 10 and a signal transmitting and receiving device 20. The signal transmitting and receiving device 10 and the signal transmitting and receiving device 20 perform bidirectional communication via a common transmission path 30. The signal transmitting and receiving device 10 is provided on the host device side, and the signal transmitting and receiving device 20 is provided on the peripheral device side. The data rate of the first signal $S_1$ transmitted from the signal transmitting and receiving device 10 to the signal transmitting and receiving device 20 via the transmission path 30 is higher than the data rate of the second signal $S_2$ transmitted from the signal transmitting and receiving device 20 to the signal transmitting and receiving device 10 via the transmission path 30. The input/output terminal 19 of the signal transmitting and receiving device 10 and the input/output terminal 29 of the signal transmitting and receiving device 20 are connected to each other by the transmission path 30.

The signal transmitting and receiving device 10 includes a controller 14, a training pattern generator 15, and a selector 16, in addition to the configuration of the signal transmitting and receiving device 10A shown in FIG. 1. The training pattern generator 15 generates and outputs a training pattern (signal) used when the receiver 23 performs frequency locking. The training pattern signal may be, for example, a clock signal in which a high level and a low level alternately appear in a constant cycle. The selector 16 receives the first signal $S_1$ output from the host device as serial data, receives the training pattern signal output from the training pattern generator 15, selects one of the first signal $S_1$ and the training pattern signal, and outputs the selected signal to the driver 11. The driver 11 transmits the first signal $S_1$ or the training pattern signal output from the selector 16 to the signal transmitting and receiving device 20 via the input/output terminal 19 and the transmission path 30.

The receiver 13 receives the second signal $S_2$ output from the filter 12, recovers data and a clock signal based on the second signal $S_2$, and outputs the recovered data (recovery data) and the recovered clock signal (recovery clock signal) to the host device and the controller 14. The controller 14 receives the recovered data and the recovered clock signal, controls an operation of generating the training pattern signal by the training pattern generator 15, and controls an operation of selecting one of the first signal $S_1$ and the training pattern signal by the selector 16. The receiver 13 may include a clock and data recovery (CDR) circuit.

The signal transmitting and receiving device 20 comprises a controller 24, in addition to the configuration of the signal transmitting and receiving device 20A shown in FIG. 1. The receiver 23 performs frequency locking on the first signal $S_1$ or training pattern signal output through the filter 22 to recover data and a clock signal, outputs the recovered data (recovery data) and the recovered clock signal (recovery clock signal) to the peripheral device, and outputs the recovered clock signal to the controller 24. The frequency of this recovered clock signal coincides with (or corresponds to) the data rate of the first signal $S_1$. The controller 24 receives the recovered clock signal output from the receiver 23, and the controller 24 obtains frequency information of the recovered clock. Based on the frequency information, the controller 24 controls the cutoff frequency of the filter 22 and the operation of the driver 21. The receiver 23 may include a clock and data recovery (CDR) circuit. Details of the control by the controller 24 are as follows.

The controller 24 determines the cutoff frequency of the filter 22 that can pass the first signal $S_1$ based on the frequency information of the recovered clock signal. The controller 24 controls the cutoff frequency of the filter 22 to be lower as the frequency of the recovered clock signal is lower, and controls the cutoff frequency of the filter 22 to be higher as the frequency of the recovered clock signal is higher. The controller 24 may determine the maximum cutoff frequency of the filter 22 that can pass the first signal $S_1$.

The controller 24 determines a slew rate of a waveform of the second signal $S_2$ that can sufficiently attenuate harmonic components by the filter 22. The controller 24 controls the slew rate of the waveform of the second signal $S_2$ to be lower as the frequency of the recovered clock signal is lower, and the controller 24 controls the slew rate of the waveform of the second signal $S_2$ to be higher as the frequency of the recovered clock signal is higher. The controller 24 may determine the maximum slew rate of the waveform of the second signal $S_2$ that can sufficiently attenuate harmonic components by the filter 22.

The controller 24 determines the data rate of the second signal $S_2$ that can be output by the driver 21 at the aforementioned slew rate. The controller 24 controls the data rate of the second signal $S_2$ to be lower as the frequency of the recovered clock signal is lower, and the controller 24 controls the data rate of the second signal $S_2$ to be higher as the frequency of the recovered clock signal is higher. The controller 24 may determine the maximum data rate of the second signal $S_2$ that can be output by the driver 21 at the aforementioned slew rate.

Based on these determinations, the controller 24 controls the cutoff frequency of the filter 22 and controls the operation of the driver 21.

Figure 5:
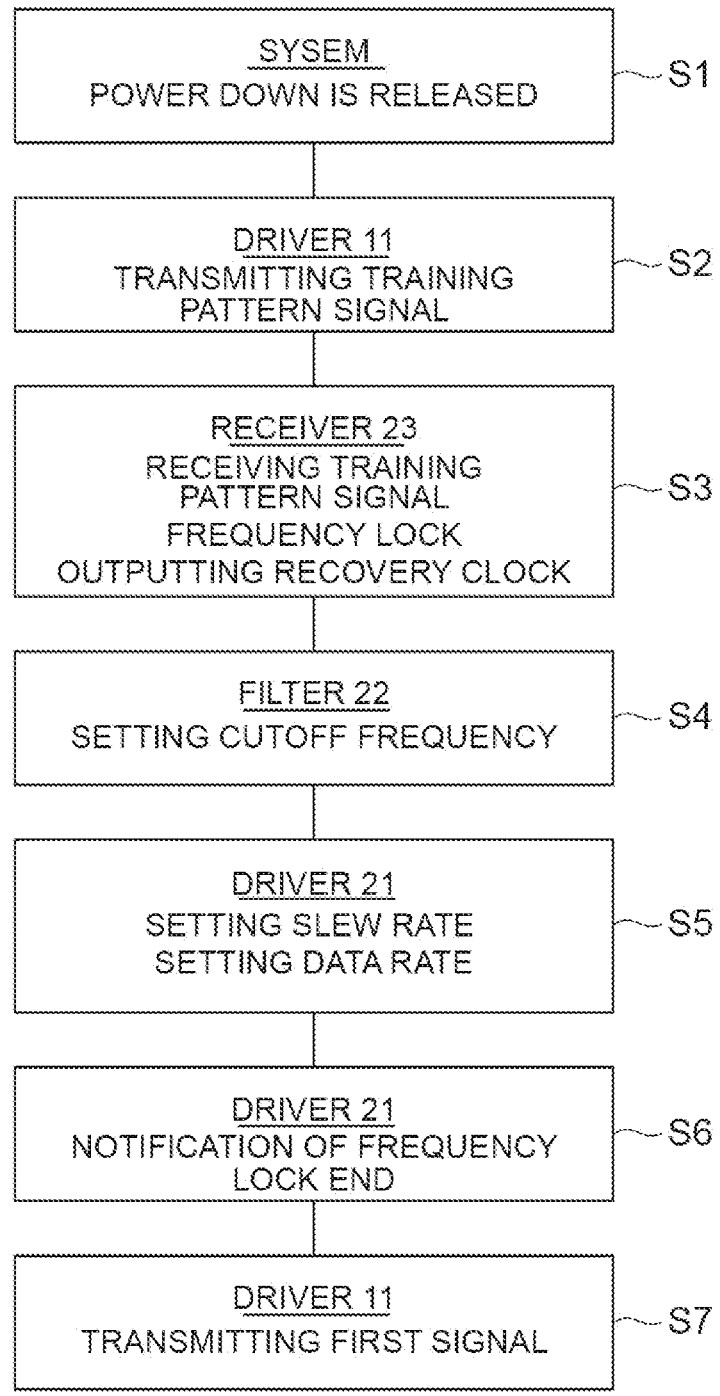
FIG. 5 is a flowchart showing an operation example of the bidirectional communication system 1.

The controller 24 may determine the cutoff frequency of the filter 22, the slew rate of the waveform of the second signal $S_2$, and the data rate of the second signal $S_2$ output from the driver 21, based on the frequency information of the recovered clock output from the receiver 23 that received the first signal $S_1$. However, it is preferable for the controller 24 to determine the cutoff frequency of the filter 22 and the slew rate of the waveform of the second signal $S_2$, and the data rate of the second signal $S_2$ output from the driver 21 based on the frequency information of the recovered clock signal output from the receiver 23 that received the training pattern signal prior to the reception of the first signal $S_1$. FIG. 5 is a flowchart showing an operation example of the bidirectional communication system 1 in the latter case.

When the power down state of the bidirectional communication system 1 is released (step S1), in the signal transmitting and receiving device 10, the controller 14 controls the training pattern generator 15 to output the training pattern signal, and controls the selector 16 to select and output the training pattern signal, so that the driver 11 outputs the training pattern signal (step S2).

In the signal transmitting and receiving device 20, the receiver 23 receives the training pattern signal output from the signal transmitting and receiving device 10 which is the other-side signal transmitting and receiving device and passed through the transmission path 30 and the filter 22, performs frequency locking on the training pattern signal, and outputs the recovered clock signal (recovery clock signal) having a frequency that coincides with (or corresponds to) the data rate of the first signal $S_1$ to the controller 24 (step $S_3$). At this time, it is preferable that the driver 21 is stopped. Alternatively, the cutoff frequency of the filter 22 may be set to the lowest value, and the driver 21 may operate with the data rate and the slew rate set to the lowest values.

The controller 24 receiving the recovered clock signal output from the receiver 23 determines the maximum cutoff frequency of the filter 22 capable of passing the first signal $S_1$, and controls the cutoff frequency of the filter 22 based on the determination (step S4). Also, the controller 24 determines the maximum slew rate of the waveform of the second signal $S_2$ that can sufficiently attenuate the harmonic components by the filter 22, determines the maximum data rate of the second signal $S_2$ that can be output by the driver 21 at the slew rate, and controls the operation of the driver 21 based on these determinations (step S5). By these controls, the cutoff frequency of the filter 22 and the slew rate of the waveform of the second signal $S_2$ and data rate of the second signal $S_2$ output from the driver 21 are set to optimum values.

When these settings are completed, the controller 24 controls the driver 21 to notify the signal transmitting and receiving device 10 on the other side that the frequency locking for the training pattern signal by the receiver 23 has been completed (step S6). At this time, the frequency locking end notification signal (notification of frequency locking end) output from the driver 21 is transmitted to the signal transmitting and receiving device 10 through the transmission path 30 at the slew rate and the data rate set in step S5.

In the signal transmitting and receiving device 10, when the receiver 13 receives the frequency locking end notification signal transmitted from the signal transmitting and receiving device 20 through the transmission path 30 and passed through the filter 12, the receiver 13 notifies the controller 14 of the reception. Upon receiving the notification, the controller 14 stops generation and output of the training pattern by the training pattern generator 15, and the controller 14 controls the selector 16 to select and output the first signal $S_1$, so that the driver 11 outputs the first signal $S_1$ (step S7). In the signal transmitting and receiving device 20, after the driver 21 sends the frequency locking end notification signal to the signal transmitting and receiving device 10, the receiver 23 starts reception of the first signal $S_1$ that has passed through the filter 22 from the signal transmitting and receiving device 10 via the transmission path 30.

At this time, the cutoff frequency of the filter 22 is already optimally set in step S4, and the slew rate of the waveform of the second signal $S_2$ and the data rate of the second signal $S_2$ output by the driver 21 are already optimally set in step S5. Accordingly, the filter 22 can pass the first signal $S_1$ while blocking the second signal $S_2$ and can also block harmonics of the second signal $S_2$.

As described above, in the bidirectional communication system 1 adopting the frequency division (duplex) method, the signal transmitting and receiving device (transceiver) 20 can optimally set the cutoff frequency of the filter 22 and the slew rate of the waveform of the second signal $S_2$ and data rate of the second signal $S_2$ output from the driver 21 with respect to the data rate of the first signal $S_1$ desired according to the application based on the first signal $S_1$ or the training pattern signal transmitted from the signal transmitting and receiving device 10 via the transmission path 30. Further, the signal for notifying the signal transmitting and receiving device 10 that the setting has been completed in the signal transmitting and receiving device 20 is transmitted through the transmission path 30 for transmitting the first signal $S_1$ and the second signal $S_2$. In the present embodiment, the transmission path 30 for transmitting the first signal $S_1$ and the second signal S₂ is used as a transmission path for setting various operation conditions of the signal transmitting and receiving device 20. Therefore, in the present embodiment, the number of transmission paths and connectors does not increase, which eliminates the problem of increased weight and cost. Additionally, the frequency division method adopted in this embodiment is superior to other bidirectional communication methods in terms of weight, cost, latency, EMI, power consumption, and other factors.

The present invention is not limited to the above-described examples, but is defined by the claims and is intended to include all modifications within the meaning and scope equivalent to the claims.

What is claimed is:

1. A signal transmitting and receiving device configured to receive a first signal that has reached an input/output terminal sent from an other-side signal transmitting and receiving device, and transmit a second signal to the other-side signal transmitting and receiving device though the input/output terminal, by using bidirectional communication with the other-side signal transmitting and receiving device though a transmission path, the second signal having a data rate lower than a data rate of the first signal, the signal transmitting and receiving device comprising:
   a filter connected to the input/output terminal and configured to selectively pass and output the first signal, and selectively attenuate the second signal, from between the first signal and the second signal;
   a receiver configured to receive the first signal output through the filter, recover data and a clock signal based on the first signal, and output the recovered data and the clock signal;
   a driver configured to send the second signal from the input/output terminal to the other-side signal transmitting and receiving device; and
   a controller configured to control a cutoff frequency of the filter and the data rate of the second signal output from the driver based on a frequency of the recovered clock signal output from the receiver.

2. The signal transmitting and receiving device according to claim 1, wherein
   the receiver receives a training pattern signal from the other-side signal transmitting and receiving device before starting reception of the first signal from the other-side signal transmitting and receiving device, performs frequency locking on the training pattern signal, and outputs the recovered clock signal having a frequency that corresponds to the data rate of the first signal.

3. The signal transmitting and receiving device according to claim 2, wherein
   the controller controls the cutoff frequency of the filter to be lower as the frequency of the recovered clock signal is lower, and controls the cutoff frequency of the filter to be higher as the frequency of the recovered clock signal is higher.

4. The signal transmitting and receiving device according to claim 2, wherein
   the controller controls the data rate of the second signal to be lower as the frequency of the recovered clock signal is lower, and controls the data rate of the second signal to be higher as the frequency of the recovered clock signal is higher.

5. The signal transmitting and receiving device according to claim 2, wherein
   the controller controls a slew rate of a waveform of the second signal to be lower as the frequency of the recovered clock signal is lower, and controls the slew rate of the waveform of the second signal to be higher as the frequency of the recovered clock signal is higher.

6. The signal transmitting and receiving device according to claim 2, wherein the driver notifies the other-side signal transmitting and receiving device that the receiver ends the frequency locking on the training pattern signal.

7. The signal transmitting and receiving device according to claim 6, wherein the receiver starts reception of the first signal from the other-side signal transmitting and receiving device after the driver notifies the other-side signal transmitting and receiving device that the frequency locking has ended.

8. The signal transmitting and receiving device according to claim 1, wherein the filter includes a high-pass filter or a bandpass filter.

9. A bidirectional communication system comprising:
   the signal transmitting and receiving device according to claim 1; and
   the other-side signal transmitting and receiving device configured to perform bidirectional communication with the signal transmitting and receiving device via the transmission path.

10. A signal transmitting and receiving device comprising:
    a filter connected to an input/output terminal;
    a clock and data recovery circuit connected to an output terminal of the filter;
    a driver comprising an output terminal connected to the input/output terminal; and
    a controller configured to receive a recovered clock signal output from the clock and data recovery circuit, and control a cutoff frequency of the filter and a data rate of the driver.

* * * * *